United States Patent [19]

Markevka et al.

[11] Patent Number: 4,775,719

[45] Date of Patent: Oct. 4, 1988

[54] THERMALLY STABLE HOT MELT MOISTURE-CURE POLYURETHANE ADHESIVE COMPOSITION

[75] Inventors: Virginia C. Markevka, Maplewood; Sandra J. Mackey, St. Paul; William L. Bunnelle, Stillwater, all of Minn.

[73] Assignee: H. B. Fuller Company, St. Paul, Minn.

[21] Appl. No.: 823,608

[22] Filed: Jan. 29, 1986

[51] Int. Cl.$^4$ .................... C08L 47/00; C08L 75/00
[52] U.S. Cl. .................... 525/125; 525/130; 525/131
[58] Field of Search ............ 525/125, 130, 131

[56] References Cited

U.S. PATENT DOCUMENTS

| | | | |
|---|---|---|---|
| 2,555,745 | 5/1951 | Hopkins et al. | 117/138.8 |
| 3,437,622 | 4/1969 | Dahl | 260/24 |
| 3,637,359 | 1/1972 | Malloy et al. | 525/130 |
| 3,671,301 | 6/1972 | Dahl | 117/122 |
| 3,686,107 | 8/1972 | Russell | 260/27 |
| 3,707,531 | 1/1974 | Dahlquist et al. | 260/876 |
| 3,736,281 | 5/1973 | Russell | 260/27 |
| 3,914,484 | 10/1975 | Creegan et al. | 428/42 |
| 3,931,077 | 1/1976 | Uchigaki et al. | 525/130 |
| 3,950,858 | 11/1974 | Park | 260/27 |
| 3,970,717 | 7/1976 | Muller-Albrecht et al. | 260/859 |
| 4,021,391 | 5/1977 | Ijichi et al. | 260/27 |
| 4,091,195 | 5/1978 | Vitck | 526/52 |
| 4,337,297 | 6/1982 | Karim et al. | 525/125 |

Primary Examiner—John C. Bleutge
Assistant Examiner—A. Carrillo
Attorney, Agent, or Firm—Merchant, Gould, Smith, Edell, Welter & Schmidt

[57] ABSTRACT

A one-package thermally stable hot melt pressure-sensitive moisture-cure polyurethane composition that can be extruded at elevated temperatures to form a hot melt glue line with very high green strength that can moisture-cure to a strong urethane adhesive bond.

11 Claims, No Drawings

THERMALLY STABLE HOT MELT MOISTURE-CURE POLYURETHANE ADHESIVE COMPOSITION

FIELD OF THE INVENTION

This invention relates to a hot melt moisture-curing thermosetting urethane adhesive. The solvent-free compositions of this invention can be extruded at elevated temperature to form initial uncured bonds of high strength after cooling, in other words, having high initial green strength. The high quality green bond can maintain the structural integrity of the joined substrates until the green bond line can cure to a hard, resilient, strong, cohesively bonded mass.

BACKGROUND OF THE INVENTION

Generically, both hot melt adhesives and thermosetting urethane adhesives are well known generic adhesive classes. Compositions known as hot melt adhesives have the advantage that they can be conveniently applied by extruding the compositions at elevated temperature directly onto a substrate and can result in the formation of a structural bond with another substrate as the temperature of the adhesive mass cools. While hot melt adhesives have many benefits they have the drawback that the compositions tend to be temperature sensitive. In other words the bonding mass tends to lose bond strength as the temperature of the bonding mass and the substrate is increased. Further, hot melt adhesives can be physically unstable in the presence of hydrocarbon solvents and other organics.

In sharp contrast, while thermosetting moisture-cure urethane adhesives commonly have little initial green strength, such thermosetting compositions can cure over time to form a rigid, resilient, highly crosslinked bond of high tensile strength. Such adhesives have value where initial strength is not important since substantial bonding often forms over a period of time between a matter of hours to days. Typically such urethane adhesives are used by clamping the substrate-adhesive-substrate combination together with a sufficient amount of the adhesive and permitting the adhesive to cure over a period of time in order for the adhesive to form a fully set bond. However, thermosetting adhesives can have weak green (uncured) bonds. Further, many polyurethane adhesives have a short useful life less than 10 hours, when maintained at elevated temperature during storage and use. Clearly the combination of moisture cure and hot melt properties in a single adhesive is a desirable goal since the resulting adhesive, in theory, could possess a quick high strength green bond and a strong crosslinked adhesive joint.

One suggested adhesive that combines hot melt properties and thermosetting moisture-cure urethane properties is disclosed in Uchigaki, U.S. Pat. No. 3,931,077, which teaches a reactive hot-melt adhesive composition comprising a reactive urethane prepolymer, a thermoplastic polymer, and a tackifying resin. Uchigaki suggests that hot-melt moisture cure urethane thermosetting adhesives should have a urethane prepolymer having a viscosity higher than 300,000 cP at 25° C. Uchigaki suggests that viscosities substantially lower than that disclosed in Uchigaki result in adhesive compositions having suitable viscosity for application but having inferior instant adhesive strength (green strength). Further, Uchigaki teaches that tackifier components that can be used in the hot-melt-thermosetting adhesives should be a terpene phenol copolymer or abietic acid type resins whose active hydrogens or double bonds are at least partly removed by esterification. Such compositions include tackifier resins such as a hydrogenated rosin, a hydrogenated rosin glycerine ester, a hydrogenated rosin pentaerythritol ester, disproportionated rosin, polymerized rosin, etc. Uchigaki further teaches that other types of tackifiers are reactive with isocyanate groups on the prepolymer composition and are therefore undesirable. Further, Uchigaki suggests that still other types of tackifiers are insufficiently miscible with the adhesive components to result in a stable blend.

Uchigaki suggests using thermoplastic polymer compositions in the adhesive composition such as an ethylene vinyl acetate copolymer. Uchigaki teaches that the ethylene component of the copolymer is in the range of 30–95 wt-%, preferably 60–81 wt-%. When the ethylene content is less than 30 wt-%, while the miscibility is good, the final adhesive strength is too low for practical use.

BRIEF DESCRIPTION OF THE INVENTION

We have found that by attempting to duplicate the adhesive compositions taught in Uchigaki, the resulting cured bondlines comprise a brittle composition of little cohesive bond strength. We have further found that for a reasonable combination of hot-melt and thermosetting polyurethane properties, (1) the polyurethane prepolymer must have a substantially lower viscosity than that shown in Uchigaki; (2) the ethylene-vinyl monomer should have 55 wt-% or less of ethylene; and (3) the tackifying resins which cooperate with the other components in the adhesive to result in high initial green strength should be an aromatic tackifying resin or an aliphatic-aromatic tackifying resin substantially free of any phenol components. The adhesives of this invention have high initial green strength, a high degree of chemical resistance when cured, a high pot life (an extended period, as much as 16 hours or more at 300° F. and as much as 3 days at 200° F.). We have found that the adhesive of this invention when fully cured has a high ultimate tensile strength and high elongation at break.

DETAILED DESCRIPTION OF THE INVENTION

We have found that the adhesive of the invention comprises a polymeric polyethylene-vinyl monomer component, an aromatic or aliphatic-aromatic tackifying resin and a liquid urethane prepolymer.

Prepolymers

Prepolymers useful in the hot melt-moisture curing adhesives of this invention comprise substantially liquid prepolymers having a viscosity of 25,000 cP or less at 25° C. Preferably the viscosity of the prepolymer is between 5,000 and 20,000 cP at 25° C. Typically the prepolymers of the invention are made by reacting a polyisocyanate compound with a polyhydroxy compound having a hydroxyl number and molecular weight sufficient to obtain the appropriate viscosity.

Polyisocyanate compounds useful for forming the prepolymers of the invention include organic aromatic polyisocyanates having an isocyanate functionality of about 2 or more and at least 1 aromatic group. The polyisocyanate compound of the invention can have 1 to 10 aromatic groups, preferably for reasons of reactivity and low cost the polyisocyanate compound can have from 2 to 5 aromatic groups. The polyisocyanate may also contain other substituents which do not substantially adversely affect the viscosity of the isocyanate terminated prepolymer, or the adhesive properties of the cured bond line. The polyisocyanate compounds can also comprise mixtures of both aromatic and aliphatic isocyanates. Typical aromatic polyisocyanates include diphenylmethane diisocyanate compounds (MDI) including its isomers, carbodiimide modified MDI, diphenylmethane 4,4'-diisocyanate, diphenylmethane 2,2'-diisocyanate, diphenylmethane 2,4'-diisocyanate, oligomeric methylene isocyanates of the following formula:

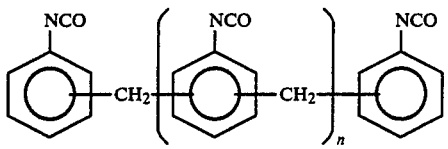

wherein n is an integer of 2 to 5, and mixtures thereof; toluene diisocyanate compounds (TDI), including the isomers thereof, isomers of naphthalene diisocyanate, isomers of triphenylmethane triisocyanate, and mixtures thereof, etc. For the prepolymers of this invention the diphenylmethane diisocyanate compounds and its analogous and oligomers are preferred for reasons of availability, low cost, rapid reaction, and bonding properties including excellent strength, toughness, durability and resistance to chemical attack.

Polyhydroxy compounds suitable for forming the prepolymers of this invention are generally fluid compositions at room temperature and have a molecular weight and hydroxyl functionality which will result in a prepolymer of manageable viscosity. Typically a suitable polyhydroxy compound can have a molecular weight less than about 20,000, or typically less than 10,000, preferably in the range of 1,000 to 6,000, most preferably for reasons of reactivity and viscosity control, about 2,000 to 4,000. The hydroxyl functionality of the compounds will typically range from about 2 to 4. Higher hydroxyl functionalities can result in prepolymers of unacceptably high viscosity. We have found that bromated or phosphorylated polyols, either alone or in combination with standard polyols, can enhance flame resistant properties.

Preferred polyhydroxy compounds include polyoxyalkylene compounds having at least 2 hydroxyl groups in the molecule such as polyethylene glycols, polypropylene glycols, tetramethylene glycols, polybutylene glycols, polybutadiene diols, low molecular weight hydroxyl containing polyesters, hydroxyl containing polyester amides, polyalkylene ether glycol compounds, hydroxy containing oils including tung oil and their alkyd modifications, the most preferred hydroxy containing compounds are polymeric diols or triols of a molecular weight resulting in an appropriate viscosity.

Polymeric Component

The hot melt-moisture cure adhesives of this invention contain a polyethylene-vinyl monomer polymeric composition which in combination with the other adhesive components provides green strength to the composition before the final urethane bond is formed. The polyethylene-vinyl monomer composition should be a filmforming thermoplastic polymer that is compatible with the other components of the adhesives of the invention. Preferably the vinyl monomer of the polyethylene-vinyl monomer composition comprises an acrylate monomer or a vinyl ester of a carboxylic acid compound.

Acrylate monomers that can be used in the filmforming polymer of the invention include acrylic acid, methacrylic acid, acrylamide, methacrylamide, methyl acrylate, methyl methacrylate, 2-ethylhexyl acrylate, 2-ethylhexyl metharcylate, methoxyethyl methacrylate, methoxyethyl acrylate, and others. Acrylate monomers are well known in the art.

Vinyl esters of carboxylic acids include such monomers as vinyl acetate, vinyl butyrate, etc.

The most preferred film-forming vinyl polymers of the invention include ethylene vinyl acetate copolymers containing at least 45 wt-% winyl acetate. We have found that green strength increases with increasing molecular weight or decreasing melt index. We have also found that the compatibility of the components of the adhesive composition of this invention is sensitive to the proportion of vinyl acetate in the film-forming copolymer. At concentrations of vinyl acetate substantially less than 45 wt-% based on the polymer weight, the film-forming polymer tends to be incompatible and can result in a di- or multi-phasic adhesive composition. Further, the green strength of the bonds formed using the adhesives of this invention are increased with higher molecular weight. The molecular weight of the ethylene vinyl acetate polymers of the invention is reflected in the melt index of the polymer which can range from about 2 to about 500, preferably about 2 to 90.

Tackifying Resin

The adhesives of the invention contain a tackifying resin in combination with the film-forming polymer and the urethane prepolymer. The tackifying resins useful in the adhesives of the invention comprise aromatic or aliphatic-aromatic tackifying resins.

Aromatic resins useful in forming the adhesive compositions of this invention can be prepared from any monomer containing an aromatic moiety and a polymerizable ethylenically unsaturated group. Typical examples of aromatic monomers include styrenic monomers such as styrene, alpha-methylstyrene, vinyl toluene, methoxystyrene, tertiary butyl styrene, chlorostyrene, etc.; indene monomers including indene, methyl indene, and others. Aliphatic-aromatic tackifying resins can be made by polymerizing feed streams containing a mixture of one or more aliphatic monomers in combination with one or more aromatic monomers. Typically aromaticaliphatic resins can be formed from the aromatic monomers above in mixture with generally unsaturated petroleum feedstocks which contain C4+ monomers. The mixed aromatic-aliphatic resins contain preferably C4-6 monomers with conjugated diunsaturation. Typical monomers making up aliphatic hydrocarbon resins include 1,3-butadiene, cis-1,3-pentadiene, trans-1,3-pentadiene, 2-methyl-1,3-butadiene, 2-methyl-2-butene, cyclopentadiene, dicyclopentadiene, etc.

Preferred tackifying resins of the invention comprise styrenic copolymers having a molecular weight reflected in a ring and ball softening point that ranges from about 70° to 160° F. Most preferred tackifying resins for use in the invention comprise copolymers of alphamethylstyrene having a ring and ball softening point of about 70° to 120°. KRISTALEX 3100, 3070, 1120 or ENDEX 160 (Hercules Chemical Co.) tackifying resins are preferred for reasons of compatibility, high green strength and low cost.

In somewhat greater detail, the hot melt moisturecure urethane thermosetting adhesives of this invention typically comprise an effective bonding amount of a film-forming thermoplastic polyethylene-vinyl monomer polymer base; an effective amount of a liquid polyurethane prepolymer composition having a viscosity less than about 20,000 cP at 25° C. comprising the reaction product of a polyfunctional hydroxy compound and a polyfunctional isocyanate compound; and a phenol-free aromatic or aliphatic-aromatic polymeric tackifier composition comprising a polymer of a $C_{4-6}$ diene, a styrene monomer, an indene monomer, a cyclopentadiene monomer, or mixtures thereof and optionally an effective amount of an oxidant. The hot melt thermosetting urethane adhesive composition can be extruded as a hot melt adhesive, can form an initially high green strength hot melt bond once cooled, and can moisture-cure over a period of time to a rigid thermoset polyurethane bond.

As is well known in the art, fillers, extenders, plasticizers, thickeners, catalysts, pigments, inhibitors and the like can be included in the compositions of the invention. Neutral dry fillers are ordinarily preferred to avoid gasing of the urethane prepolymers during storage. Highly alkaline materials may have an undesired catalytic effect. Highly acid materials may attck the urethane or carbamate linkages in the prepolymer and in the finished cured bond.

Typically the hot melt thermosetting urethane adhesives of this invention can be made by preparing the isocyanate prepolymer and then blending the prepolymer with the base thermoplastic polymer, the tackifying agent and other optional ingredients.

In the formation of the liquid prepolymer phase, the polyisocyanate compound is reacted with a suitable polyhydroxy compound. The components are typically liquid in form and if desired the viscosity of the liquids can be reduced by elevated temperature. Commonly the polyisocyanate compound is heated and maintained at a temperature between 100° and 170° F. (38°-77° C.) prior to reaction with the polyhydroxy compound. The polyisocyanate can be charged into a reactor suitable for large scale production and can be placed under vacuum if necessary. The polyhydroxy compound is reacted with the polyisocyanate compound in the reactor vessel at ratios that typically depend on the hydroxy and isocyanate functionality of the reactants. Typically the compounds are reacted at ratios which result in the combination of the isocyanate materials with the hydroxy groups on the hydroxy compound, leaving little residual hydroxy. Prepolymer compositions should displace substantial isocyanate functionality. Typically from 0.25 to less than 1 mole of the polyhydroxy compound is reacted with the isocyanate compound. If desired the prepolymer can be titrated to measure the concentration of isocyanate in the prepolymer using A.S.T.M.D. 2572-80 —"Standard Methods for isocyanate Group and Urethane Materials or Prepolymers". If the composition is acceptable, it can be packaged in suitable containers. Alternatively, the balance of the components of the adhesive of the invention can be added directly to the reaction vessel in order to complete the formulation of the material.

The adhesives of this invention can be formed into a single package combining the prepolymer, the base vinyl polymer and the tackifying agent. Typically the combination can be made using standard industrial reaction or blending vessels with suitable agitation and temperature control.

Typically the adhesives of this invention are prepared using the following proportions, about 20 to 60 wt-% of the urethane prepolymer, about 10 to 50% of the base polymer, and about 10 to 60% of the tackifying agent. Preferably, the adhesives of the invention comprise about 25 to 55 wt-% of a prepolymer prepared by reacting methylenediisocyanate and a polyol, about 15 to 45 wt-% of an ethylene vinyl acetate based copolymer, and about 15 to 50% of an aromatic or aliphatic-aromatic tackifying agent. Most preferably, for reasons of low cost, rapid curing rates, and low viscosity, the compositions of the invention comprise about 30 to 50 wt-% of a prepolymer reaction product of methylenediisocyanate and a polyethylene or polypropylene glycol, about 15 to 35 wt-% of an ethylene vinyl acetate polymer having greater than 50 wt-% vinyl acetate in the polymer, and about 20 to 45 wt-% of a styrenic tackifying agent such as polystyrene or polyalphamethylstyrene copolymer.

The adhesives of this invention can be used in any adhesive application where high green strength and high tensile strength final cure bonding is highly desirable.

The following specific Examples can be used to further illustrate the invention which contain a best mode. The Examples are prepared and tested as described.

EXAMPLE I

Preparation of Prepolymer

Into a standard industrial mixer equipped with mixing equipment and a heater is charged 80.22 parts of a polyol (Poly G-55-28, an ethylene oxide capped polypropylene glycol having a molecular weight of 4,000. The Poly G polyol is heated to a temperature of 220° F. (105° C.) and is degassed under vacuum. After the polyol is sufficiently degassed, about 19.78 parts of 4,4'-diphenylmethanediisocyanate (Isonate 125M) in molten form at 150°-160° F. (68°-72° C.) are charged into the reactor containing the Poly G polyol. After completion of addition of the isocyanate the reaction temperature is raised to 165°-170° F. (74°-77° C.) The reaction is maintained at about 175° F. (80° C.). until the percent of isocyanate in the reaction mixture equals about 5.0±0.5%. At the end of the reaction the prepolymer is cooled and stored or transferred to blending equipment for preparation of the final adhesive composition.

Preparation of Adhesive Composition

Into a standard industrial mixer equipped with mixing means and heating equipment maintained at a temperature of 300° F. (150° C.), blanketed with nitrogen is added 44.57 parts of an alphamethyl styrene tackifying resin having a ring and ball softening point of about 97° to 103° C. (KRYSTALEX 3100). The mixing equipment is operated until the alphamethyl styrene is melted and into the melt is added 20.1 parts of an ethylenevinyl acetate polymer having a vinyl acetate content of 51 and a melt index of 3.5 (Vynathene EY904–25), 0.6 parts of Tinuvin P UV absorber, and 0.23 parts of IRGANOX 1010, a hindered phenol antioxidant. The contents of the industrial mixer were agitated until smoothly blended under the nitrogen blanket at a tmperature of about 300° F. (150° C.). After blending is complete the nitrogen blanket was removed and a vacuum of about 80 millimeters was initiated while the contents of the mixer was slowly agitated. After degassing is complete, a nitrogen blanket was reestablished and into the mixer was added 34.5 parts of the prepolymer prepared above. The mixer was operated until the contents were blended fully. The nitrogen blanket was removed and a vacuum of about 80 millimeters established to complete degassing. The mixture was removed, the vacuum broken and the can was sealed tightly under nitrogen. The viscosity of this product was initially 8500 cP Brookfield viscosity with a #27 spindle at 5 rpm at 300° F. After six hours the viscosity remained the same. The product had excellent head stability. The tensile strength of 3 samples of 20 mil, "dogbones" cut from cured material was 553, 486 and 611 lb/in$^2$ (uncured thickness), the elongation at break was 1629, 1911 and 2158%.

EXAMPLE II

The procedure of Example I was repeated except that 44.5 parts of the prepolymer were combined with 25 parts Vynathene EY-904-25, 30.0 parts of KRISTALEX 3100 and 0.5 parts of Irganox 1076, a bindered phenol antioxidant. The initial viscosity of the product was 12000 cP Brookfield viscosity using a SC4-21 spindle at 25 rpm at 300° F. After sixteen hours the viscosity was 14000 cP. The product had excellent heat stability.

EXAMPLE III

Urethane Prepolymer from Polybutyleneoxide Diol

Into a reaction vessel under a nitrogen blanket was added 27.86 parts of a carbodiimide modified MDI (Isonate 143L, Upjohn Co.) and 72.14 parts of a polyol, polybutylene oxide diol (XAS 10961.00, Dow Chemical). The reaction temperature was raised to 160° to 180° F. and maintained in that temperature range until the percent of free isocyanate in the reaction mixture was about 5.0±0.5%. At the end of the reaction, the prepolymer was transferred to blending equipment for preparation of the final adhesive composition.

Preparation of Adhesive Composition

The procedure of Example I was repeated except that 44.5 parts of the prepolymer described above were combined with 25.0 parts of Vynathene EY904-25, 30.0 parts of KRISTALEX 3100 and 0.5 parts of Irganox 1076.

EXAMPLE IV

Into a suitably equipped reaction vessel is charged 69.36 parts of Poly G 55-28. The Poly G polyol is degassed by the same procedure as described under Example I. After the polyol is sufficiently degssed, 22.93 parts of 4,4'-diphenylmethanediisocyanate (Isonate 125M) in the molten form at 150°-160° F. (68°-72° C.) are charged into the reaction containing the Poly G polyol. The reaction temperature is raised to approximately 175° F. and maintained in the range of 165°-180° F. for 1 hour. To this mixture was added 7.71 parts of tetrabromobisphenol A (Saytech RB100). The reaction temperature was maintained in the range of 165°-180° F. until the percent of free isocyanate was equal to 5.0± 0.5%. At the end of the reaction, the product is cooled and stored or transferred to blending equipment for the preparation of the final adhesive composition.

Preparation of Adhesive Composition

The procedure of Example I was repeated except that 44.5 parts of the prepolymer described above were combined with 25.0 parts of Vynathene EY 904-25, 30.0 parts of KRISTALEX 3100 and 0.5 parts of Irganox 1076.

Test Procedures

The above tensile strength, percent elongation and the oven pell and oven shear tests were performed using the following procedures.

Using an INSTRON tensile tester or equivalent, a teflon draw down sheet, an ASTM D412 type C dye and a micrometer, a 20 millimeter film of the adhesive is laid down on the teflon draw down sheet. The film is removed from the sheet and 5 dogbone samples are cut from the film using a type C dye. The samples should have a gauge section width of 0.25 inches. The sample is typically conditioned for 18 hours at 25° C., 50% relative humidity. The tensile tester jaws are set to a 1-inch gap and the samples are attached. The samples are elongated by the tester at a strain rate of 10 inches per minute until the sample breaks, while the stress vs. strain is recorded. Tensile strength is calculated by dividing the force by the cross-sectional area of the sample. The strain elongation is calculated by dividing the sample length by the initial sample gap and multiplying by 100%.

Oven peel tests and shear tests are performed using the following method. Two sheets of kraft paper 6 inches by 12 inches and two sheets of release paper measuring 2 inches by 12 inches are cut. One piece of kraft paper is taped to a heat insulator and onto that piece the two sheets of release paper are taped over the kraft paper lengthwise leaving a space exactly one inch wide. A second piece of kraft paper is layered on top of the release paper so that is entirely covers the first piece of kraft paper. One end of the second piece of kraft paper is securely taped to the first. The second piece of kraft paper is folded back and a glass rod (½ inch OD-8 inches long) with a 10 mil shim is placed on the tape hinge. An unshimmed glass rod having the same overall dimensions is placed below the second sheet of kraft paper as close to the tape hinge as possible. The second piece of kraft paper is now between the two glass rods, the shimmed rod is on top and in view. A stream of hot melt at a typical application temperature, 350° F., is placed onto the first piece of kraft paper on the 1 inch base between the release paper. The glass rods are directed across the bottom sheet of kraft paper. The shimmed glass rod draws the hot melt into a film and the second rod pulls the second piece of kraft paper over onto the layer of hot melt bonding the first paper to the second paper. Six pieces of "sandwich" can be cut width-wise having dimensions of 1×4 inches. The six samples are suspended in a programmable oven capable of a 25° C. per hour temperature increase from 25° C. to 150° C. A 100 gram weight is attached to the tail of each three samples to peel one sheet of kraft paper from another. A 500 gram weight is attached to the tail of each of the three samples in order to remove the tail of each of the three samples in order to remove one paper from another paper in a shear mode. The samples are observed and the temperature at which the samples delaminate is measured.

| Length of Cure | Shears °C. (°F.) | Peels °C. (°F.) |
| --- | --- | --- |
| Immediate (no cure) | 26° (78.5°) | 27° (79.7°) |
| 24 hours | No failure at 100° (212°) | 71° (160.0°) |
| 3 days | 129° (265.0°) | 79° (174.3°) |
| 7 days | 122° (253.0°) | 81° (177.3°) |
| 10 days | 105° (220.5°) | 82° (178.0°) |
| 14 days | 92° (197.0°) | 85° (183.7°) |
| 21 days | 96° (204.5°) | 92° (197.5°) |

While peel values are increasing with time, shear values reach a peak early, decrease, then level out.

The above description, Examples and detail of the invention provides sufficient understanding of the invention, since many embodiments of the invention can be made without departing from the spirit and scope of the invention, the invention resides in the claims hereinafter appended.

I claim:

1. A hot melt thermosetting urethane adhesive composition having thermal stability that can be extruded as a hot melt adhesive to form an initially high green strength hot melt bond and can moisture cure to a rigid moisture cure polyurethane bond, which comprises:
    (a) an effective green bonding amount of a film-forming thermoplastic ethylene-vinyl monomer copolymer wherein the vinyl monomer comprises an acrylate monomer or a vinyl ester of a carboxylic acid compound;
    (b) an effective amount of a liquid polyurethane prepolymer composition, having a viscosity of less than 25,000 cP at 25° C., comprising the reaction product of a polyfunctional hydroxy compound having a number average molecular weight of at least 1,000 and a polyfunctional isocyanate compound having an isocyanate functionality of about 2 or more at a ratio of hydroxyl groups to isocyanate groups of 0.1 to 0.7:1, sufficient to form a rigid moisture-cure bond;
    (c) a phenol-free, aromatic or aliphatic-aromatic polymer tackifier comprising a monomer selected from the group consisting of a $C_{4-6}$ diene, a styrenic monomer, an indene monomer, dicyclopentadiene, and mixtures thereof; and
    (d) about 0 to 5 wt-% of an antioxidant.

2. The composition of claim 1 wherein the ethylene-vinyl monomer copolymer comprises an ethylene vinyl acetate copolymer having an ethylene content of about 10 to 55 wt-%.

3. The composition of claim 2 wherein the ethylene-vinyl acetate copolymer has about 45 to 60 wt-% vinyl acetate.

4. The composition of claim 3 wherein the ethylene-vinyl acetate copolymer has a vinyl acetate concentration of 50 to 60 wt-%, a melt index of about 2-90, and is present in the adhesive composition at a concentration of 15 to 35 wt-%.

5. The composition of claim 1 wherein the prepolymer is the reaction product of a polyalkylene glycol and an aromatic polyfunctional isocyanate compound having an isocyanate functionality of about two or more.

6. The composition of claim 5 wherein the polyalkylene glycol is an alkylene oxide capped polypropylene glycol, the aromatic polyfunctional isocyanate compound having an isocyanate functionality of about 2 or more is diphenyl methane diisocyanate, the prepolymers are present in the adhesive composition at a concentration of 25 to 65 wt-% and the prepolymer has a viscosity of about 100 to 10,000 cP at 25° C.

7. The composition of claim 6 wherein the prepolymer is present in the adhesive composition at a concentration of 30 to 50 wt-% and has a viscosity of about 2,000–8,000 cP at 25° C.

8. The composition of claim 1 wherein the tackifier is a styrenic copolymer comprising one or more styrenic monomers selected from the group consisting of styrene, alpha-methylstyrene, vinyl toluene, methoxystyrene, tertiary butyl styrene, and chlorostyrene.

9. The composition of claim 1 wherein the tackifier is a styrene homopolymer, an alpha-methylstyrene homopolymer, or a styrenic copolymer comprising one or more styrenic monomers selected from the group consisting of styrene and alpha-methylstyrene and one or more aliphatic $C_{4-6}$ monomers with conjugated diunsaturation.

10. An adhesive having both hot melt and thermosetting urethane adhesive properties which comprises:
    (a) about 10 to 50 wt-% of an ethylene vinyl acetate copolymer having a melt index of 2-90 and a vinyl acetate content of greater than 50 wt-%;
    (b) about 20 to 60 wt-% of polyurethane prepolymer comprising the reaction product of a polypropylenediol and diphenyl methane diisocyanate at a ratio of hydroxyl groups to isocyanate groups of about 0.2–0.5:1, having a viscosity of less than 10,000 cP at 25° C.;
    (c) about 10 to 60 wt-% of a polymeric tackifying resin comprising a styrenic polymer compound selected from the group consisting of polystyrene and poly-alpha-methylstyrene; and
    (d) about 10 to 60 wt-% of an antioxidant.

11. The adhesive of claim 10 wherein the viscosity of the prepolymer is 2,000–6,000 cP at 25° C.

* * * * *

UNITED STATES PATENT AND TRADEMARK OFFICE
CERTIFICATE OF CORRECTION

PATENT NO. : 4,775,719

DATED : October 4, 1988

INVENTOR(S) : VIRGINIA C. MARHEVKA et al

It is certified that error appears in the above-identified patent and that said Letters Patent is hereby corrected as shown below: Title page:

Item [75], for "Virginia C. Markevka" read --Virginia C. Marhevka--.
Column 1, line 41, for "substrateadhe-" read --substrate-adhe- --.
Column 4, line 10, for "metharcylate" read --methacrylate--.
Column 4, line 17, for "winyl" read --vinyl--.
Column 5, line 28, for "attck" read --attack--.
Column 6, line 68, for "tmperature" read --temperature--.
Column 7, line 14, for "head" read --heat--.
Column 7, line 24, for "bindered" read --hindered--.
Column 7, line 55, for "degssed" read --degassed--.
Column 8, line 11, for "pell" read --peel--.
Column 8, line 39, for "is" read --it--.

Signed and Sealed this

Seventh Day of March, 198

Attest:

DONALD J. QUIGG

*Attesting Officer*

*Commissioner of Patents and Trademarks*

UNITED STATES PATENT AND TRADEMARK OFFICE
CERTIFICATE OF CORRECTION

PATENT NO. : 4,775,719

DATED : October 4, 1988

INVENTOR(S) : VIRGINIA C. MARHEVKA et al

It is certified that error appears in the above-identified patent and that said Letters Patent is hereby corrected as shown below:

Column 10, line 52, for "(d) about 10 to 60 wt-% of an antioxidant." read --(d) about 0 to 5 wt-% of an antioxidant.--.

Signed and Sealed this

Eleventh Day of September, 1990

Attest:

HARRY F. MANBECK, JR.

Attesting Officer

Commissioner of Patents and Trademarks